(12) United States Patent
Lefebvre et al.

(10) Patent No.: US 11,391,179 B2
(45) Date of Patent: Jul. 19, 2022

(54) GAS TURBINE ENGINE WITH BEARING SUPPORT STRUCTURE

(71) Applicant: PRATT & WHITNEY CANADA CORP., Longueuil (CA)

(72) Inventors: Guy Lefebvre, St-Bruno-de-Montarville (CA); Remy Synnott, St-Jean-sur Richelieu (CA); François Doyon, Ste-Julie (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 248 days.

(21) Appl. No.: 16/273,493

(22) Filed: Feb. 12, 2019

(65) Prior Publication Data
US 2020/0256212 A1  Aug. 13, 2020

(51) Int. Cl.
*F01D 25/16* (2006.01)
*F01D 25/18* (2006.01)

(52) U.S. Cl.
CPC ......... *F01D 25/164* (2013.01); *F01D 25/162* (2013.01); *F01D 25/183* (2013.01); *F05D 2240/50* (2013.01); *F05D 2240/55* (2013.01)

(58) Field of Classification Search
CPC .................................................. F01D 25/164
See application file for complete search history.

(56) References Cited

U.S. PATENT DOCUMENTS

| 5,088,277 A | 2/1992 | Schulze |
| 5,326,222 A | 7/1994 | Matyscak et al. |
| 5,622,438 A | 4/1997 | Walsh et al. |
| 6,266,954 B1 * | 7/2001 | McCallum .............. F01D 25/12 60/776 |
| 7,493,769 B2 | 2/2009 | Jangili |
| 8,128,339 B2 | 3/2012 | Kondo et al. |
| 8,641,362 B1 | 2/2014 | Liang |
| 8,894,359 B2 | 11/2014 | Munshi et al. |
| 9,279,341 B2 | 3/2016 | Durocher et al. |
| 9,546,567 B2 | 1/2017 | Kasibhotla et al. |
| 9,605,592 B2 | 3/2017 | Jewess |
| 9,782,834 B2 | 10/2017 | Kolluru et al. |
| 9,874,111 B2 | 1/2018 | Stevens et al. |
| 9,970,322 B2 | 5/2018 | Suciu et al. |
| 10,006,306 B2 | 6/2018 | Scott et al. |

(Continued)

FOREIGN PATENT DOCUMENTS

| CA | 2307577 A1 | 5/1999 |
| CA | 2660211 C | 2/2008 |

(Continued)

*Primary Examiner* — Ninh H. Nguyen
*Assistant Examiner* — John S Hunter, Jr.
(74) *Attorney, Agent, or Firm* — Norton Rose Fulbright Canada LLP

(57) ABSTRACT

The gas turbine engine can have a structure for holding bearings within a casing, with a shaft being rotatably mounted to the casing via the bearings and via the structure, the structure having a first wall segment and a base structure receiving the bearings, the first wall segment having a proximal end structurally joined to the base structure, the first wall segment extending away from the base structure, and having a portion extending at least partially axially and thereby being radially flexible relative to the second wall segment, the structure providing both structural resistance and radial stretchability.

16 Claims, 4 Drawing Sheets

(56) References Cited

U.S. PATENT DOCUMENTS

| | | |
|---|---|---|
| 10,094,285 B2 | 10/2018 | Munshi et al. |
| 10,145,255 B2 | 12/2018 | Miller et al. |
| 10,161,256 B2 | 12/2018 | Porter et al. |
| 10,161,264 B2 | 12/2018 | Husband et al. |
| 10,167,734 B2 | 1/2019 | Sonokawa et al. |
| 10,329,956 B2 | 6/2019 | Scott |
| 10,533,458 B2 | 1/2020 | Tanimura et al. |
| 2015/0354382 A1 | 12/2015 | Pakkala et al. |
| 2017/0067365 A1 | 3/2017 | Mukhopadhyay et al. |
| 2017/0067369 A1 | 3/2017 | Hashimoto et al. |
| 2017/0198604 A1 | 7/2017 | Lefebvre et al. |
| 2017/0284225 A1 | 10/2017 | Hashimoto |
| 2017/0307019 A1 | 10/2017 | Vicogne et al. |
| 2018/0230850 A1 | 8/2018 | Karstadt et al. |
| 2018/0274443 A1 | 9/2018 | Pointon et al. |
| 2019/0301302 A1 | 10/2019 | Eastwood et al. |
| 2020/0030924 A1 | 1/2020 | Cabello et al. |
| 2020/0032664 A1 | 1/2020 | Beaujard et al. |

FOREIGN PATENT DOCUMENTS

| | | |
|---|---|---|
| CA | 2672096 C | 10/2011 |
| CA | 2936674 A1 | 1/2017 |
| CA | 2701405 C | 2/2017 |
| CA | 2882565 C | 5/2017 |
| CA | 2949010 A1 | 5/2017 |
| CA | 2881774 C | 10/2017 |
| CA | 2963407 A1 | 10/2017 |
| CA | 2963409 A1 | 10/2017 |
| CA | 3020816 A1 | 10/2017 |
| CA | 2715227 C | 11/2017 |
| CA | 2928979 C | 6/2018 |
| CN | 204921169 U | 12/2015 |
| CN | 205036457 U | 2/2016 |
| CN | 102678334 B | 8/2016 |
| CN | 104919140 B | 3/2018 |
| CN | 105960511 A | 3/2018 |
| CN | 106460550 A | 4/2018 |
| CN | 109899177 A | 6/2019 |
| CN | 110325713 A | 10/2019 |
| EP | 1642009 B1 | 4/2006 |
| EP | 1781900 B1 | 6/2014 |
| EP | 2218892 B1 | 7/2018 |
| EP | 2586701 B1 | 12/2018 |
| EP | 2187019 B2 | 3/2019 |
| EP | 2813685 B2 | 4/2019 |
| EP | 2647801 B1 | 5/2019 |
| EP | 2938859 B1 | 5/2019 |
| EP | 2900998 B1 | 6/2019 |
| EP | 2938847 B1 | 8/2019 |
| EP | 3524779 A1 | 8/2019 |
| EP | 2977739 B1 | 11/2019 |
| FR | 3005097 B1 | 7/2017 |
| GB | 884596 A | 11/1956 |
| JP | 3072044 B2 | 7/2000 |
| JP | 2018076857 A | 5/2018 |
| KR | 20190006333 A | 1/2019 |
| WO | 2017144207 A1 | 8/2017 |
| WO | 2018146405 A1 | 8/2018 |

\* cited by examiner

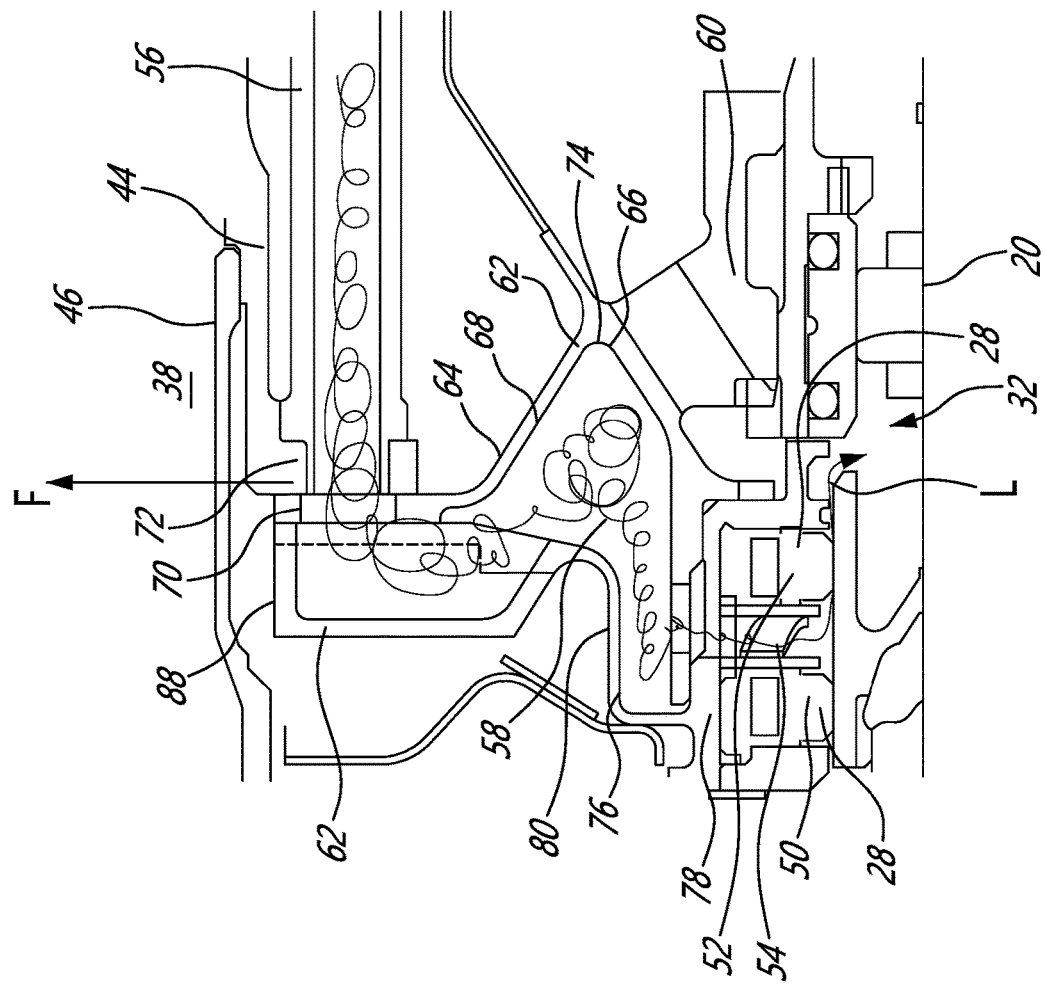

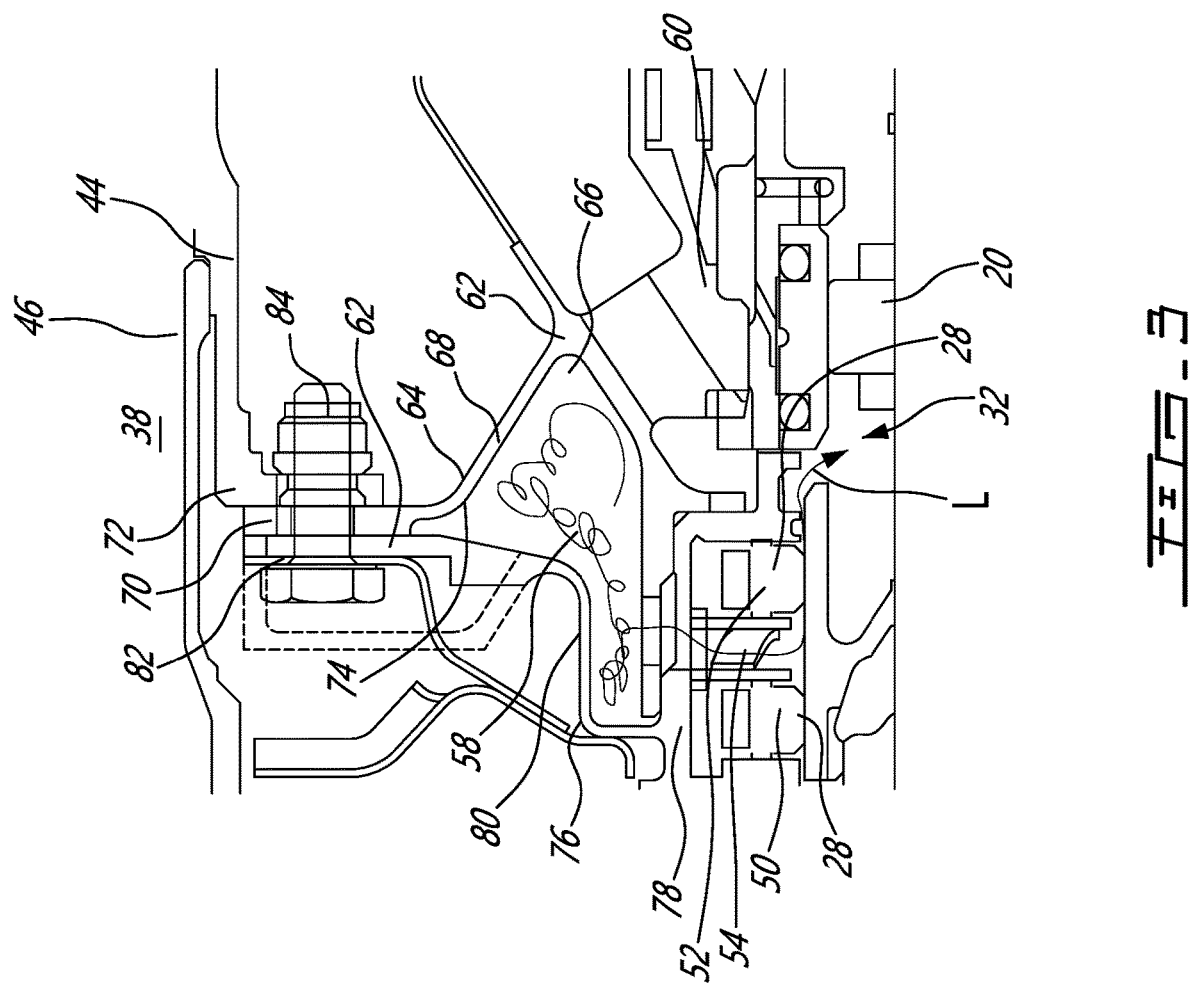

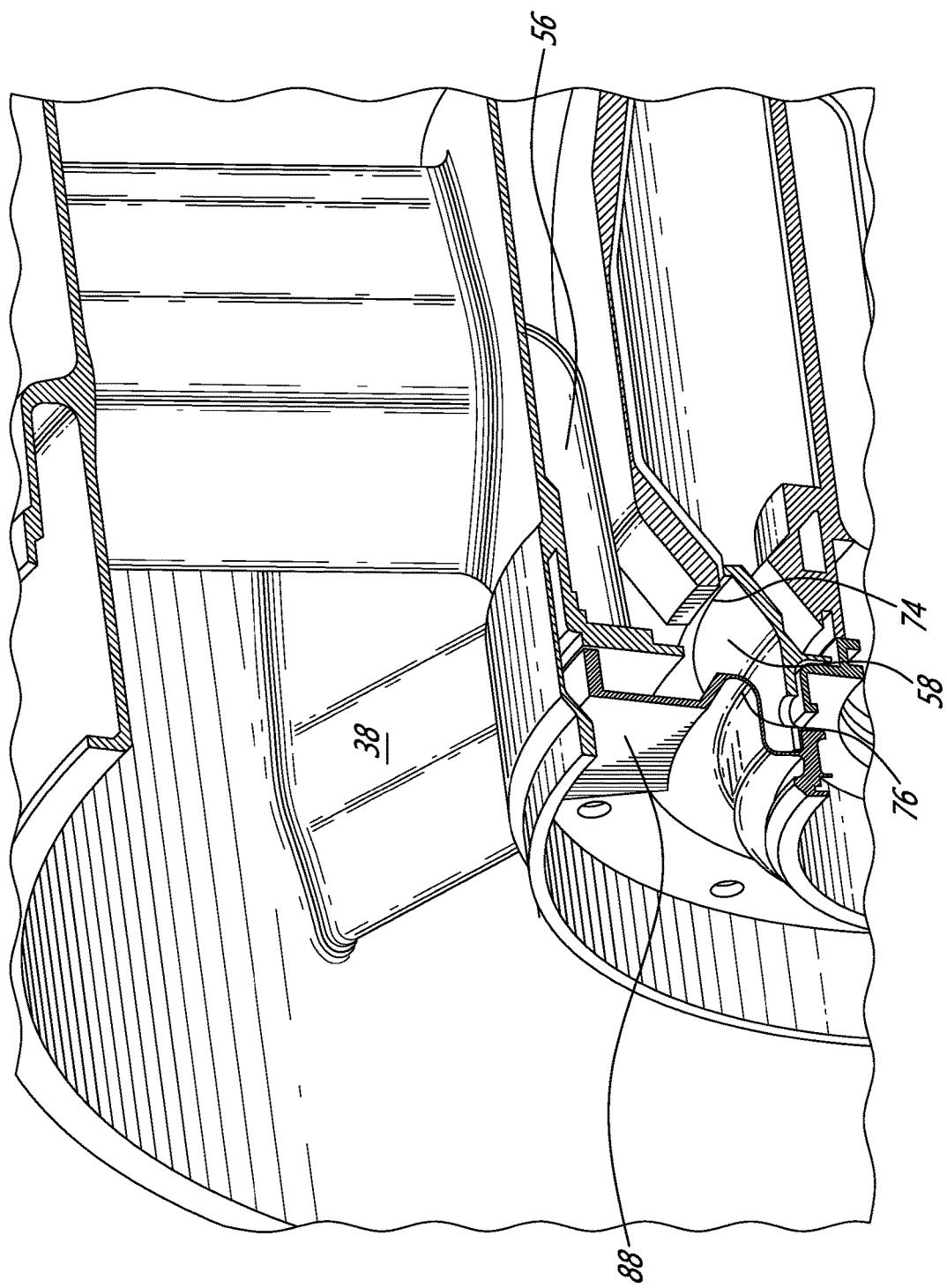

GAS TURBINE ENGINE WITH BEARING SUPPORT STRUCTURE

TECHNICAL FIELD

The application related generally to gas turbine engines and, more particularly, to a structure used to support the bearing and rotary shaft within the engine casing.

BACKGROUND OF THE ART

In gas turbine engines, a rotary shafts holding compressor/fan and turbine blades are typically rotatably mounted within a casing via bearings. The bearings are typically located radially inwards relative to the annular flow path formed by duct walls of the casing. Bearings are continuously supplied with oil for lubrication. During operation, the oil mixes with air, and the oil is contained in a bearing cavity and recuperated. Seals can axially delimit the bearing cavity. A positive pressure can be maintained towards the bearing cavity, to prevent the air/oil mixture from crossing the seal in the opposite direction. In some cases, it is possible to supply the pressurized air to the seal along a supply path located radially internally to the main, annular flow path. However, in some cases, such supply paths are not readily available. There remained room for improvement.

SUMMARY

In one aspect, there is provided a gas turbine engine having a rotary shaft mounted to a casing via bearings housed in a bearing cavity, the bearing cavity at least partially delimited by a bearing housing and by a bearing seal, the bearing housing having a first wall segment and a second wall segment both extending circumferentially, the first wall segment having a proximal end structurally joined to the second wall segment, the first wall segment extending away from the second wall segment, a feed pipe connected to the first wall segment, a portion of the first wall segment extending at least partially axially between the feed pipe and the second wall, and thereby being radially flexible relative to the second wall segment.

In another aspect, there is provided a structure for holding bearings within a casing, with a shaft being rotatably mounted to the casing via the bearings and via the structure, the structure having a first wall segment and a base structure receiving the bearings, the first wall segment having a proximal end structurally joined to the base structure, the first wall segment extending away from the base structure, and having a portion extending at least partially axially and thereby being radially flexible relative to the second wall segment.

In a further aspect, there is provided a method of operating a gas turbine engine, the method comprising conveying pressurized air radially inwardly within a plenum to a bearing seal, the plenum being located axially between two plenum walls, the two plenum walls extending radially between a housing and a casing of the gas turbine engine; and simultaneously to said conveying, stretching the two plenum walls collectively in the radial orientation.

DESCRIPTION OF THE DRAWINGS

Reference is now made to the accompanying figures in which:

FIG. 2 is cross-sectional view taken along a radial and axial plane, at a circumferential position corresponding to an inlet pipe, showing an example of a structure of the gas turbine engine;

FIG. 3 is a cross-sectional view similar to FIG. 2, but taken at a different circumferential position, away from the inlet pipe;

FIG. 4 is an oblique view of the structure of the gas turbine engine.

DETAILED DESCRIPTION

Figure 1:
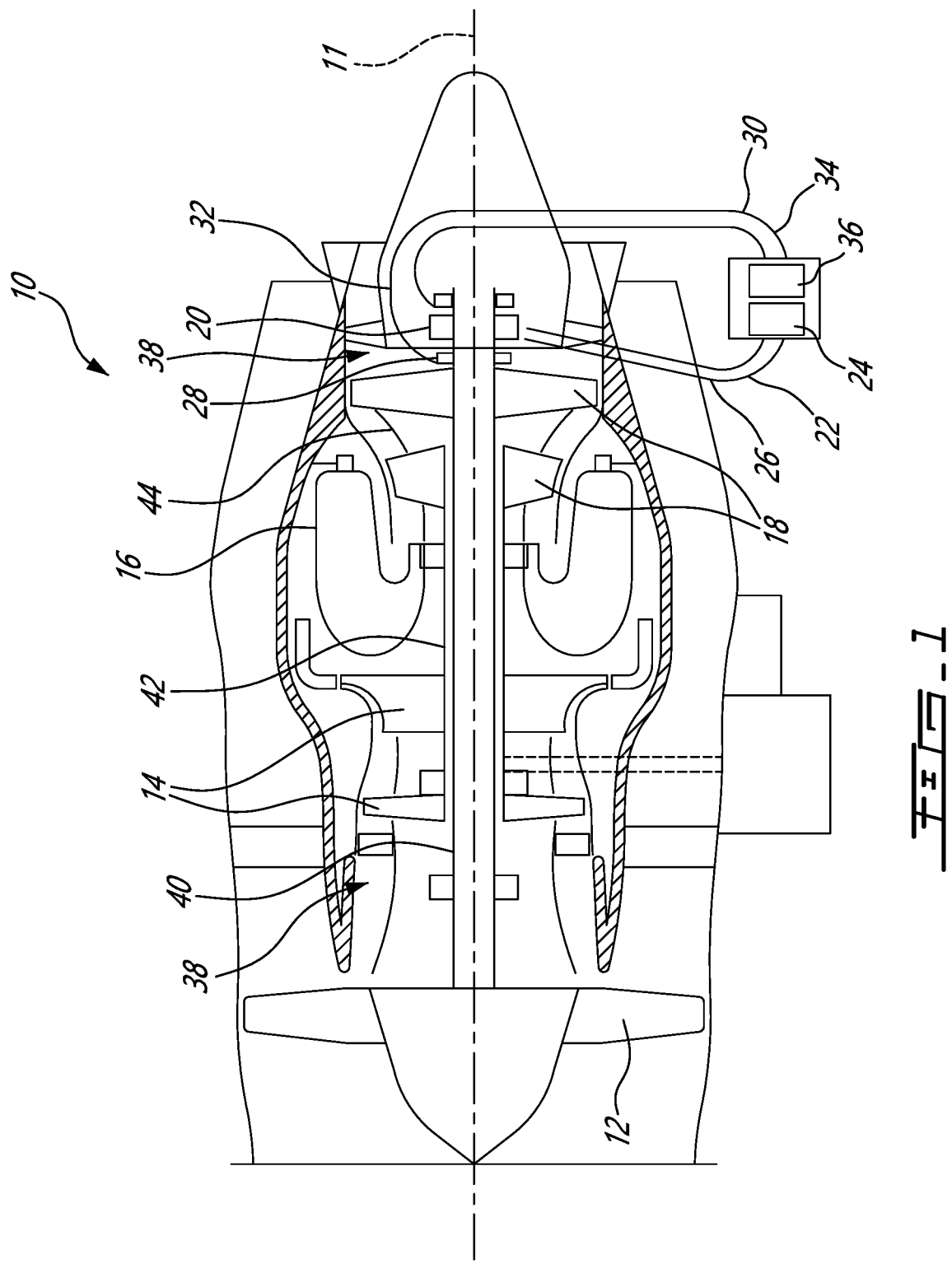
FIG. 1 is a schematic cross-sectional view of a gas turbine engine.

FIG. 1 illustrates a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. An annular gas flow path 38 extends sequentially across the fan 12, compressor section 14, combustor 16, and turbine section 18.

The compressor section 14, fan 12 and turbine section 18 have rotating components which can be mounted on one or more shafts 40, 42, which, in this embodiment, rotate concentrically around a common axis 11. Bearings 20 are used to provide smooth relative rotation between a shaft (40 or 42) and casing 44 (non-rotating component), and/or between two shafts which rotate at different speeds. An oil lubrication system 22 typically including an oil pump 24 and a network of oil delivery conduits and nozzles 26, is provided to feed the bearings 20 with oil. The bearings are housed in corresponding bearing cavities 32, which are typically terminated at both axial ends by seals 28, used to contain the oil. A scavenge system 30 typically having conduits 34, and one or more scavenge pumps 36, can be used to recover the oil from the bearing cavities 32.

FIG. 2 shows the area of an example gas turbine engine 10 surrounding a bearing 20. In practice, the bearing 20 includes a plurality of roller components distributed annularly around the axis of the rotary shaft. In the cross-sectional view shown in FIG. 2, which is taken along a plane which extends axially and radially, always relative to the axis 11 of the shaft 40, and only shows an upper half portion of the gas turbine engine 10, only one of the roller components is shown.

FIG. 2 also shows a duct wall 46 forming a radially internal delimitation to the annular gas path 38. The duct wall 46 forms part of the casing 44. One of the seals 28 is also shown, the seal 28 can be seen to include two axially adjacent seal components 50, 52, with a pressure chamber 54 therebetween. The pressure chamber 54 needs to be supplied with pressurized air to apply the positive pressure and leakage flow L across the seal component 52 and into the bearing cavity 32. In this embodiment, there was no pressure source available radially internally to the annular gas path 38, and piping 56, in combination with a plenum 58 was thus used to supply the pressurized air across the annular gas path 38 and to the pressure chamber 54.

The casing 44 can be structurally connected to the bearing 20, and ultimately to a rotary shaft, via a support structure 62. In this embodiment, the support structure 62 is partially defined by the bearing housing 60 as will be discussed below. The bearing cavity 32 can be fully or partially delimited by the bearing housing 60, such as via a structure made integral thereto.

In this embodiment, the duct wall 46 is an exhaust duct wall, and it reaches relatively high temperatures, such as around 1200° C., during normal operating conditions. Therefore, the duct wall 46 is subjected to a strong amount of thermal expansion during normal operation conditions. The bearing 20 is typically maintained at a significantly lower temperature. This can be achieved by extracting heat with the oil, or by providing the bearing cavity with cooling air, and the latter can be provided via the leakage flow L, to name one example. Accordingly, there can be a significant difference in thermal growth between the duct wall 46 and the bearing housing 60, and the support structure 62 which connects the casing 44 to the bearing 20 can therefore need to be designed in a manner to accommodate such differences in thermal growth. In this embodiment, the accommodation of differences in thermal growth is achieved by configuring the support structure 62 in a manner to simultaneously provide structural support, while also allowing it to stretch radially as it is "pulled" radially outwardly by the growing annulus of the duct wall 46 as the latter is subjected to the stronger thermal growth.

In this embodiment, such radial stretchability is achieved by incorporating flexible structures shaped as a "hairpin", and more specifically having two segments fully or partially parallel to one another, structurally joined to one another at a proximal end, and having corresponding distal ends which can be stretched apart from one another based on the elastic deformation capability of the material composing at least one of the two segments. In this context, the at least one flexible segment acts partially as structure, offering structural resistance via which the casing 44 is structurally connected to the bearing 20, and partially as a spring, allowing to accommodate the greater thermal growth of the casing 44, or thermal growth difference between the bearing housing 60 and the casing 44, during typical operating conditions.

More specifically, in this embodiment, the bearing housing 60 has a first wall segment 64 and a second wall segment 66 both extending circumferentially/annularly. The first wall segment 64 has a proximal end structurally joined to the second wall segment 66, and a portion 68 of the first wall segment 64 extends conically, partially radially and partially axially. The first wall segment 64 terminates in a radially-oriented flange 70 at its distal end, which is secured axially against a corresponding radially inwardly oriented flange 72 forming part of the casing 44.

During typical operation, the higher thermal growth of the casing structure will generate a force F, generally oriented radially outwardly, onto the flange 70 of the first wall segment 64. The first wall segment 64 has a given thickness, which provides it a certain level of rigidity and structural strength to support the rotary shaft within the casing 44. However, given the fact that the thickness is limited, and that it is made of an appropriate material (a metal in this case), the first wall segment also has a given amount of elastic deformation capability, allowing it to bend elastically, to a certain extent, as its distal end is pulled radially outwardly relative to its proximal end and relative to the second wall segment 66.

Making the first wall segment 64 thicker will make it stiffer, but at the cost of additional weight. In this embodiment, it was preferred to increase the stiffness, for a given thickness, by orienting the flexing portion 68 of the first wall segment 64 off axial, i.e. to make it conical. Indeed, there is a trigonometric relationship between the amount of radially-imparted flexing ability, and the degree to which the first wall segment 64 is oriented off axial, and closer to radial orientation.

The second wall segment 66 acts essentially as a base structure in this embodiment, and exhibits significantly less flexing ability than the first wall segment 64. This being said, it can nonetheless be said to form a hairpin shape as the second wall segment 66 and the first wall segment 64 are partially parallel to one another, essentially forming a spring, and since the spacing between the wall segments 64, 66 is oriented at least partially axially, the spring ability can operate in the radial orientation of the force F.

In the embodiment shown in FIG. 2, a pressurized air conduit is provided across the annular gas path 38, leading to the pressurized chamber 54 of the seal 28. In this example, piping, provided here in the form of a feed pipe 56, is used to bring pressurized air inside a strut extending across the annular gas path 38. The feed pipe 56 is fluidly connected to a plenum 58 which receives the pressurized air from the feed pipe 56 and redistributes it circumferentially around the rotary shaft's axis 11, into the annularly configured seal 28.

It will be noted that in this case, the plenum 58 is formed between a first plenum wall 74 and a second plenum wall 76, both plenum walls 74, 76 being (generally) solid-of-revolution shaped and extending annularly around the axis 11. In this example, both plenum walls 74, 76 are configured in a manner to provide a degree of structure, and a degree of flexibility, and collectively form a radially stretchable support structure 62 in addition to collectively forming a plenum 58 of the pressurized air path. Both plenum walls 74, 76 can be said to have a hairpin shape, even though the hairpins are oriented here in opposite axial orientations. In alternate embodiments, the could be oriented in the same axial orientation, and be roughly offset to one another, for instance.

The first plenum wall 74 can be said to include the first wall segment 64 referred to earlier, and to be structurally integral to the bearing housing 60.

In this embodiment, the seal 28 is provided with a seal housing component 78 which is manufactured separately from the bearing housing 60 though assembled in a manner to be structurally integral to the bearing housing 60. This can facilitate the designing of the plenum 74, as it can, in this manner, naturally be formed out of two separate components, and each plenum wall 74, 76 can be easier to manufacture independently than a monolithic plenum would be to manufacture, the first plenum wall 74 being manufactured with the bearing housing 60 in this case, and the second plenum wall 76 being manufactured as part of the seal housing 78, in this example. This is optional and can vary in alternate embodiments.

The second plenum wall 76 can be seen to project radially outwardly from a roughly cylindrical portion of the seal housing, and then curves, leading to a cylindrical flexing portion 80. The cylindrical flexing portion 80 of the second plenum wall 76 (which can alternately be referred to as a third wall segment) is parallel and spaced apart from the cylindrical portion of the seal housing 78, and can flex radially inwardly or outwardly when its distal end is subjected to corresponding forces. The cylindrical flexing portion can lead to another curve, radially outwardly, leading to a flange 82 at its distal end (better seen in FIG. 3), which can be axially secured to the flange 70 of the first plenum wall 64 and to the flange 72 of the casing 46 using fasteners 84, for instance (see FIG. 3, which shows a cross-sectional view similar to FIG. 2 but taken at a different circumferential position, spaced apart from the feed pipe 56). It will be noted that in other embodiments, if more stiffness is desired, it could have been preferred to orient the flexing portion 80 of the second plenum wall 76 obliquely between the axial and radial orientations, for instance (i.e. to shape it conically rather than cylindrically).

It can be desired to make the plenum 58 airtight except for its intended inlet(s) and outlet(s). To this end, a gasket can be used between the flanges 82, 70 of the third wall segment 76 and first wall segment 64, for instance. However, in some other embodiments, using a smooth contact finish between the flanges 82, 70 may be considered to provide sufficient air-tightness for the application considered to avoid recourse to a third sealing component. It will be noted here that depending on the application, more than one feed pipe 56 can be used, and that plural feed pipes can be circumferentially spaced-apart from one another, for instance.

It will be noted that to achieve radial stretchability (and compressibility), the flexible wall portions 80, 68 have a limited thickness, are made of a material exhibiting elastic flexibility, and are oriented at least partially axially. At least partially axially refers to the fact that the orientation is at least partially off from radial, and can even, if found suitable, be completely normal from radial (i.e. perfectly axially oriented/cylindrical).

The presence of two wall segments forming the "hairpin" shape can be optional, and can be omitted on either one, or both, of the plenum walls in some embodiments. Indeed, as long as a flexing portion is provided which extends axially or obliquely between the casing and some form of less flexible support structure leading to the bearing or seal, the desired combined functionality of structural casing/shaft support and radial stretchability may be achieved. In such cases, the wall segment having a flexing portion can be considered, to a certain extent, as being cantilevered from such support structure. In the example presented above, the radially stretchable support structure also offers the third functionality of providing a plenum and pressurized air path, which is achieved by using a combination of two plenum walls, but this third functionality may be omitted in some embodiments, in which case a single wall with a flexible portion may be considered sufficient.

In the example presented above, it will be noted that the plenum 58 is provided outside the bearing cavity 32, and that the feed pipe 56 can be snugly nested into the flange 72 of the casing 44. The feed pipe 56 can be brazed or welded in order to secure it sealingly into place, for instance.

The oblique view presented in FIG. 4 can help better understand the configuration of a subchamber 88 which is provided at a circumferential position in axial alignment with the feed pipe 56, for axially receiving the pressurized air into a spacing provided between the two plenum walls 74, 76, and to convey this pressurized air to the plenum 58 (also shown in FIG. 2). It will be noted here that the cross-section of FIG. 4 is similar to the cross-section of FIG. 2, in the sense that it is taken across the subchamber 88 and in a manner to show the feed pipe 56. In this embodiment, the subchamber does not extend around the entire circumference, but only along a relatively limited arc, as shown in FIG. 4 and found suitable to perform the function of receiving the pressurized air and conveying it to the main chamber/plenum 58. The main chamber, in this embodiment, extends fully around the circumference, and the regions which are circumferentially outside the subchamber region can be as shown in the cross-section of FIG. 3. Accordingly, a double wall geometry is used to form the plenum 58 external to the bearing seal 28 on 360 degrees, and a subchamber 88 is provided at a given, limited circumferential location, which provides the communication of pressure from the feed conduit 56 to the plenum 58.

The above description is meant to be exemplary only, and one skilled in the art will recognize that changes may be made to the embodiments described without departing from the scope of the invention disclosed. For example, there may be other reasons for using the disclosed geometry, which can provide the combined functions of structure and radial stretchability, than to accommodate a difference of thermal expansions between a casing and a bearing, and therefore, the disclosed geometry may find uses in other sections of a gas turbine engine than the combustor, turbine, or exhaust sections. Still other modifications which fall within the scope of the present invention will be apparent to those skilled in the art, in light of a review of this disclosure, and such modifications are intended to fall within the appended claims.

The invention claimed is:

1. A gas turbine engine having a rotary shaft mounted to a casing via a bearing housed in a bearing housing, the bearing enclosed in a bearing cavity at least partially delimited by a bearing seal, the bearing housing having a wall, the wall including a first wall segment and a second wall segment located radially inwardly of the first wall segment, both of the first wall segment and the second wall segment extending circumferentially, the first wall segment having a proximal end structurally joined to the second wall segment, the first wall segment extending away from the second wall segment, a feed pipe connected to the first wall segment, the first wall segment having a portion located radially between the feed pipe and the second wall segment, the portion extending from a first end to a second end, the first end being axially and radially offset from the second end relative to a rotation axis of the rotary shaft, the second end located radially inwardly of the first end, the second wall segment extending radially inwardly from the second end of the portion of the first wall segment.

2. The gas turbine engine of claim 1 further comprising a first plenum wall and a second plenum wall forming a plenum between the first plenum wall and the second plenum wall, external to the bearing cavity, the plenum fluidly connecting the feed pipe to the bearing seal, the first plenum wall including the first wall segment, the first plenum wall and the second plenum wall having a hairpin shape oriented at least partially axially and being radially flexible.

3. The gas turbine engine of claim 2 wherein the second plenum wall is structurally joined to a seal housing.

4. The gas turbine engine of claim 3 wherein a free end of the first plenum wall and a free end of the second plenum wall are secured to one another adjacent the feed pipe connection.

5. The gas turbine engine of claim 4 wherein the free end of the first plenum wall and the free end of the second plenum wall extend radially, and a casing flange is sandwiched between the first plenum wall and the second plenum wall, the casing flange projecting radially inwardly from a duct portion of the casing.

6. The gas turbine engine of claim 3 wherein the second plenum wall has a portion extending at least partially axially, parallel to, and radially spaced apart from a portion of the seal housing.

7. The gas turbine engine of claim 2 wherein the second plenum wall structurally connects the casing to a seal housing.

8. The gas turbine engine of claim 2 wherein the rotary shaft is structurally connected to the casing further via the first plenum wall and the second plenum wall.

9. The gas turbine engine of claim 2 wherein the second plenum wall has an axially-oriented cylindrical portion.

10. The gas turbine engine of claim 1 wherein the portion of the first wall segment is conical.

11. The gas turbine engine of claim 1 wherein the second wall segment is conical.

12. The gas turbine engine of claim 1 wherein the second wall segment extends both axially forward and axially rearward away from the first wall segment relative to a rotation axis of the rotary shaft.

13. The gas turbine engine of claim 1 wherein the first wall segment and the second wall segment extend around an entire circumference relative to an axis of the rotary shaft, and have a solid of revolution shape.

14. The gas turbine engine of claim 1 wherein the first wall segment structurally connects the casing to the bearing housing.

15. The gas turbine engine of claim 1, wherein the portion of the first wall segment is frustoconical.

16. The gas turbine engine of claim 1, wherein the portion slopes axially and radially from the first end to the second end.

* * * * *